(No Model.)
A. D. PUFFER.
FILTER.
No. 308,575. Patented Nov. 25, 1884.
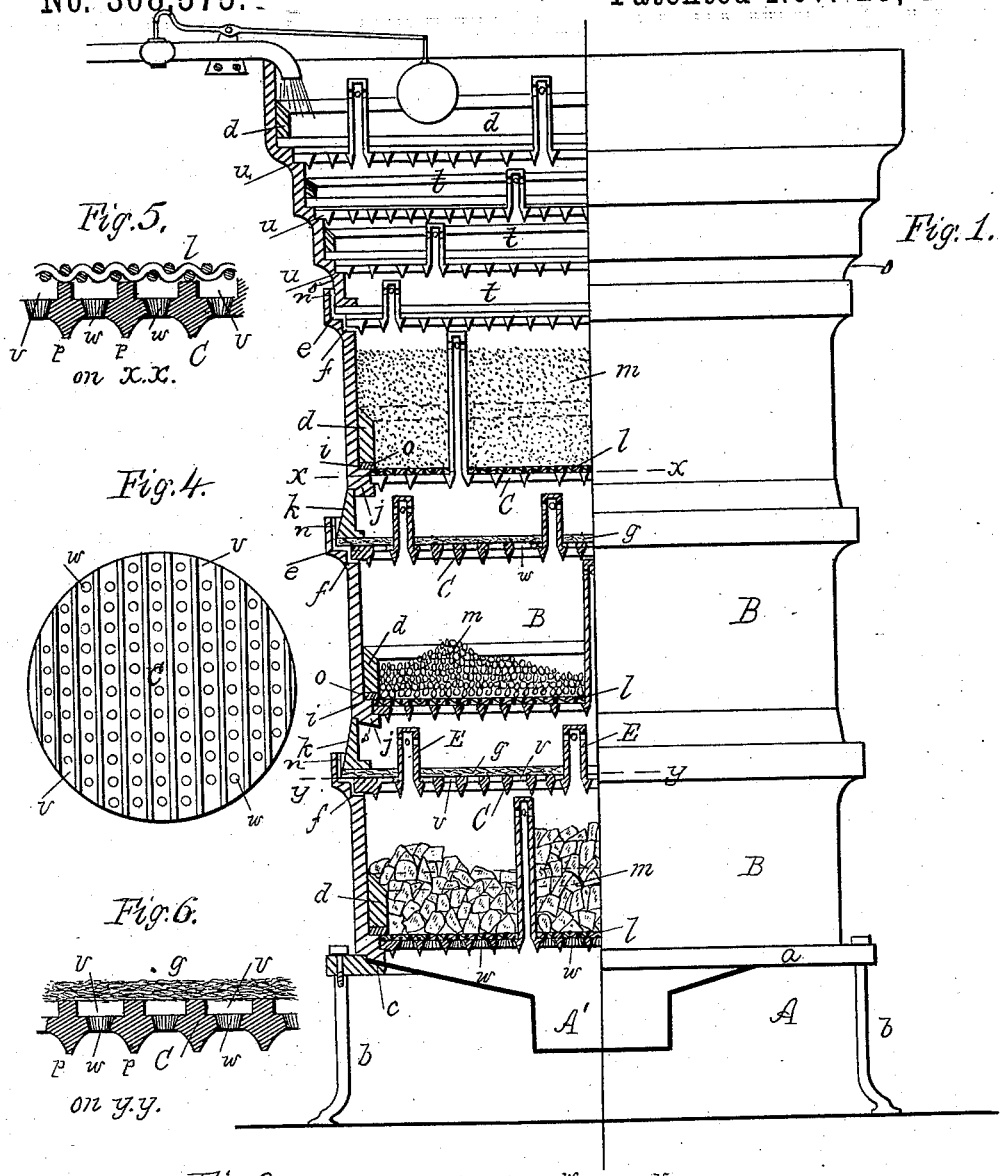
WITNESSES
H. E. Lodge
A. F. Hayden
INVENTOR
Alvin D. Puffer.
by W. H. Babcock
Attorney

UNITED STATES PATENT OFFICE.

ALVIN DAVIS PUFFER, OF MEDFORD, MASSACHUSETTS.

FILTER.

SPECIFICATION forming part of Letters Patent No. 308,575, dated November 25, 1884.

Application filed May 21, 1883. (No model.)

*To all whom it may concern:*

Be it known that I, ALVIN DAVIS PUFFER, a citizen of the United States, residing at Medford, in the county of Middlesex and State of Massachusetts, have invented certain new and useful Improvements in Filters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In this filter I employ a series of interchangeable sections adapted to be placed one above the other, according to the desired capacity of filter, each section being in itself a complete filter, or a component part of an entire filter, as the case may be. I also employ means for carbonating and reducing the temperature of the water by the introducing of air, which intercepts the water as it flows through the apparatus.

Details of my invention consist in the employment of interior grooves or channels for allowing egress or ingress of air, and preventing leakage between any two sections; in the construction of the draining-plates which support the filtering materials, whereby the water is subdivided and distributed over a large surface, the more effectually to absorb the carbonic acid in the air, and be reduced in temperature by evaporation; in the employment with each section of a ring of considerable weight placed upon the margin of the felt or other filtering-sheet and the sheet of wire-cloth placed in the bottom of each section, to prevent loss of the mass of loose filtering material with which each section is filled, the purpose of this ring being to pack the joint between any two sections and prevent leakage of water thereat. Other details of my invention will be hereinafter described.

The drawings accompanying this specification represent, in Figure 1, a vertical section of a filter containing my invention. Fig. 2 is a section of one of the drainer-plates, and Fig. 3 a section of one of the sections of the filter to be explained. Fig. 4 represents a detail plan view of one of the drainer-plates; and Figs. 5 and 6 represent sectional views of drainer-plates and the material supported thereon, Fig. 5 showing wire-cloth, and Fig. 6 showing felted materials.

In said drawings, A represents the base or stand which supports the superstructure of the filter, this stand being an annular plate, $a$, with suitable feet, $b\ b$, the inner upper edge of this plate $a$ being rabbeted, as shown at $c$, to receive the lower edge of a section, as shown in Fig. 1 of the drawings. To conduct the purified water from the lower section I employ a funnel-shaped conductor, A', secured to the base A, as shown in Fig. 1.

B represents one of the sections before alluded to, such section being simply a hollow cylinder with an enlarged mouth at one end, to receive the smaller end of another section which may be placed above it. The mouth of each section is formed, preferably, with two annular ledges or seats, $e\ f$, of different diameter, the lower one, $f$, being to receive the supporting drainer-plate hereinafter explained, and the upper one, $e$, to receive the edges of the sheet, $g$, of felt or analogous material contained in the top of the section. But one ledge is necessary; but I prefer two, in order that the edges of the felt may be tightly confined between independent surfaces, the better to insure a tight joint. To the lower end of each section I add an interior annular ledge of less diameter than the body of the section, as shown at $i$ in Fig. 1, this ledge having a lesser shoulder, as shown at $j$. Below the shoulder $j$, I add to each section an annular base, $k$, which rests upon the felt in the top of the section below and packs the joint between the two sections, the weight of any one section being sufficient to insure the effectual sealing of the joint. The annular base $k$ may be cast directly upon the bottom of the section; but this enhances the difficulty of molding and casting such section, and to render such molding and casting comparatively easy I form the base $k$ of an independent ring, as shown in Fig. 1.

C in the drawings represents a flat, circular, barred, or foraminous supporting drainer-plate, to be placed in the top and bottom of each section, to support the felt in the top and the filtering material at the bottom. One of these strainer-plates C rests upon the shoulder *j* in the lower part of each section, and one upon the seat *f* in the upper part of each section, and upon the top of the plate C, which rests on the shoulder *j*, I place a screen, *l*, of wire-cloth or other finely-reticulated material, the lower screen serving to prevent escape of the mass, *m*, of animal charcoal, broken marble, or other filtering and air-distributing material with which each section is filled.

The drainer-plate C, resting upon the ledge *f*, does not have a screen of wire-cloth, but simply felted material, *g*, as the reticulated screen *l* in the section above retains the heavy material—as loam, broken marble, &c.—and only filtered or partly-filtered water passes through the felted material; hence there is no need of the screen, and it is not used.

In the event of any small quantity of water leaking through the joint between any two sections I provide means for conducting said water into the section below, thereby preventing it from escaping to the outside of the filter, and at the same time permitting of free access of air to the interior of the filter, the same consisting in forming in the enlarged mouth of each section grooves *n n*, &c., as shown in Fig. 3.

To provide a tight joint about the margin of the lower drainer-plate C, sheet of felt, or other filtering or straining agent, I employ a ring, *d*, of considerable weight, which rests upon the ledge *i*, before named, and preferably laps over the margin of such drainer-plate, as shown in Fig. 1; and I prefer to place between the ring *d* and ledge *i* a packing-ring, *o*, of rubber or other suitable material. Each plate C is formed upon its under side with a series of pointed spurs, *p p*, &c., down which the purified water drips, and from which the water is discharged and broken up and distributed over a large surface, thereby exposing it thoroughly to the action of the air and a large evaporating-surface, both of which tend to purify it and reduce its temperature. I prefer that the lower edge of each section B shall be beveled downward and inward, as shown at *s* in Fig. 1, in order to divert to the interior of the section any water that may drip from such lower edge.

The air to be supplied to the filter is fed through the channels *n n*, &c., and vertical pipes E, &c., erected upon the supporting drainer-plate C, and rising above the mass, *m*, of material in each section, such pipes being foraminous at their upper ends to permit of passage of air, but more particularly to prevent water from overflowing the section. By means of these pipes E air is conducted through the entire filter and overflowing of any section prevented. The water absorbs the carbonic-acid gas in the air, and thereby becomes purified, while at the same time, by the action of evaporation, it is reduced in temperature.

In lieu of the pipes E and channels, the air may be allowed to find its way naturally through the filtering mediums.

The mass of material in each section has the effect not only of arresting impurities in the water passing through it, but of distributing the water over a large surface, which subjects it to rapid evaporation. This material may be the same in all sections; but if several sections are to be employed I prefer to employ substances of varying density or porosity. For instance, the lower section may contain limestone or marble reduced to a coarse granulated condition, in order to permit of free passage of air through it, this material having the effect to a certain extent of charging the water with carbonic acid, thereby imparting life and sparkle to it. The section next above may contain small pebbles. The section above this may contain animal charcoal or fine sand or analogous material, alone or mixed with coarse material, such as the pebbles or granulated marble above alluded to.

I prefer that the upper sections of the filter shall be adapted to contain simply a series of the drainer-plates, wire-cloths, and felts, one above the other, with air-spaces *t t*, &c., between them, as shown in Fig. 1. To accomplish this I form the section gradually increasing in diameter at top, and form in its inner periphery a series of differential annular steps *u u*, &c., to support the drainer-plates; or one or more of the spaces *t* may be filled with black or yellow loam, which is an excellent filtering medium.

The water is supplied to the top of the filter through a pipe which, preferably, is furnished with a cock regulated by a ball-float to prevent overflow of the upper section.

In Fig. 6 of the drawings I have shown a drainer-plate having in its upper surface a series of parallel channels, *v v*, &c., crossing from side to side, with discharge-openings *w w*, &c., in the bottoms of such channels.

My object in thus subdividing the face of the drainer-plate is to prevent undue collection or centralizing of water at any one part of it. For instance, if the filter should become tilted out of perpendicular, the water would naturally tend to run to one side of the plate. The ribs before named compel the water to stand uniformly over the surface of the plate. The points upon the lower side of the drainer-plate prevent the liquid from spreading and subdivide it into minute drops.

I claim—

1. A filter consisting of interchangeable detachable sections fitting one within the other at the ends, and held together thereby without bolts or other fastenings.

2. A filter consisting of interchangeable detachable sections, each of which has an enlarged mouth at its upper end, and a flange or flanges for supporting the section next above, substantially as set forth.

3. A drainer-plate, C, perforated and provided with teats or projections on its under side, for the purpose set forth.

4. A drainer-plate the upper side of which is divided into a series of parallel channels provided with outlets to permit the flow of water to the section below, substantially as set forth.

5. A filter-section having an internal flange at or near its lower end, in combination with a ring or annular weight supported by said flange, and a strainer or filtering device held down by said ring or weight, substantially as set forth.

6. A filter-section having a ledge at its upper end and a raised flange surrounding the same, in combination with a sheet of filtering material supported by said ledge, and an annular base, $k$, which rests upon said filtering material within said flange and supports the section next above the same, substantially as set forth.

7. A filter-section, B, provided with two ledges, $e\ f$, in immediate proximity to one another, in combination with a drainer-plate supported on the lower ledge, $f$, a sheet of filtering material which rests upon said drainer-plate, but extends beyond the same over the upper ledge, $e$, and a base, $k$, which rests upon said sheet above said flanges, substantially as shown.

8. The air-pipes E, perforated at the sides near their closed upper ends, in combination with the drainer-plates, to which their open lower ends are attached, and the filter-sections which support said plates, substantially as set forth.

9. A filter consisting of sections piled one upon another, each lower section having grooves $n$ formed in its mouth, to allow the passage of air to the interior of the filter, and conducting water, if any leaks from the joint into said mouth, into the filter-section below, substantially as set forth.

10. A filter consisting of successive sections piled upon one another, in combination with air pipes and passages terminating within said sections, whereby an upward current of air is allowed to pass through the descending water, for the purpose set forth.

11. A filter-section having its lower edge constructed with an inward and downward incline, $s$, in combination with a lower section which receives the dripping from said incline, substantially as set forth.

In testimony whereof I affix my signature in presence of two witnesses.

ALVIN DAVIS PUFFER.

Witnesses:
F. CURTIS,
W. WINCH.